United States Patent
Navarrete Michelini et al.

(10) Patent No.: US 12,475,529 B2
(45) Date of Patent: Nov. 18, 2025

(54) VIDEO PROCESSING METHOD AND DEVICE, ELECTRONIC APPARATUS, AND READABLE STORAGE MEDIUM

(71) Applicant: BOE TECHNOLOGY GROUP CO., LTD., Beijing (CN)

(72) Inventors: Pablo Navarrete Michelini, Beijing (CN); Yunhua Lu, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/927,148

(22) PCT Filed: Oct. 28, 2021

(86) PCT No.: PCT/CN2021/127079
§ 371 (c)(1),
(2) Date: Nov. 22, 2022

(87) PCT Pub. No.: WO2023/070448
PCT Pub. Date: May 4, 2023

(65) Prior Publication Data
US 2024/0135488 A1   Apr. 25, 2024

(51) Int. Cl.
*G06T 3/4046* (2024.01)
*G06T 3/4053* (2024.01)
*G06T 7/73* (2017.01)

(52) U.S. Cl.
CPC .......... *G06T 3/4046* (2013.01); *G06T 3/4053* (2013.01); *G06T 7/74* (2017.01);
(Continued)

(58) Field of Classification Search
CPC ...... G06V 20/58; G06V 10/80; G06V 10/143; G06V 2201/07; G01S 13/867;
(Continued)

(56) References Cited

U.S. PATENT DOCUMENTS

2018/0288431 A1   10/2018   Liu et al.
2019/0228264 A1   7/2019    Huang et al.
(Continued)

FOREIGN PATENT DOCUMENTS

CN   109118430 A   1/2019
CN   111340711 A   6/2020
(Continued)

OTHER PUBLICATIONS

Used for backward citation search. Authored by inventor. P. N. Michelini, W. Chen, H. Liu, D. Zhu and X. Jiang, "Multi-Grid Back-Projection Networks," in IEEE Journal of Selected Topics in Signal Processing, vol. 15, No. 2, pp. 279-294, Feb. 2021, doi: 10.1109/JSTSP.2021.3049641 (Year: 2021).*
(Continued)

*Primary Examiner* — Chan S Park
*Assistant Examiner* — Paulo Andres Garcia
(74) *Attorney, Agent, or Firm* — Muncy, Geissler, Olds & Lowe, P.C.

(57) ABSTRACT

The present disclosure provides a video processing method, a video processing device, an electronic apparatus, and a readable storage medium. The video processing method includes: obtaining input data; and inputting the input data into a video processing model to obtain output video data. A resolution and/or a duration of the output video data is not equal to a resolution and/or a duration of the input data, the video processing model includes a plurality of generators arranged in sequence and corresponding to different image resolutions, each generator includes a transposed 3D convolution unit and a plurality of first 3D convolutional layers,
(Continued)

the transposed 3D convolution unit is configured to generate first output data in accordance with the input data and intermediate processing data of the generator.

15 Claims, 4 Drawing Sheets

(52) U.S. Cl.
CPC .............. *G06T 2207/10016* (2013.01); *G06T 2207/20081* (2013.01); *G06T 2207/20084* (2013.01)

(58) Field of Classification Search
CPC ...... G01S 13/931; G01S 13/865; G01S 7/411; G08G 1/16; G08G 1/166
See application file for complete search history.

(56) References Cited

U.S. PATENT DOCUMENTS

| | | | |
|---|---|---|---|
| 2019/0333198 A1 | 10/2019 | Wang et al. | |
| 2020/0012940 A1* | 1/2020 | Liu | H04N 7/0135 |
| 2020/0134804 A1* | 4/2020 | Song | G06V 10/764 |
| 2020/0160528 A1 | 5/2020 | Rhodes et al. | |
| 2020/0327334 A1* | 10/2020 | Goren | G06T 7/194 |
| 2021/0174093 A1 | 6/2021 | Li et al. | |
| 2021/0209459 A1 | 7/2021 | Navarrete Michelini et al. | |
| 2021/0279840 A1* | 9/2021 | Chi | G06T 3/40 |
| 2022/0012898 A1* | 1/2022 | Carreira | G06N 3/084 |
| 2022/0148301 A1 | 5/2022 | Hu et al. | |
| 2022/0222776 A1* | 7/2022 | Porikli | G06T 5/20 |
| 2022/0261960 A1 | 8/2022 | Wang et al. | |
| 2023/0052483 A1* | 2/2023 | Cai | G06N 3/048 |
| 2023/0344962 A1* | 10/2023 | Tran | H04N 7/0127 |

FOREIGN PATENT DOCUMENTS

| | | |
|---|---|---|
| CN | 111429355 A | 7/2020 |
| CN | 111598067 A | 8/2020 |
| CN | 111739635 A | 10/2020 |
| CN | 112528780 A | 3/2021 |
| CN | 108304755 B | 5/2021 |
| CN | 113177946 A | 7/2021 |
| WO | WO2020234449 A1 | 11/2020 |

OTHER PUBLICATIONS

Aigner, Sandra, and Marco Korner. "Futuregan: Anticipating the future frames of video sequences using spatio-temporal 3d convolutions in progressively growing gans." arXiv preprint arXiv:1810.01325 (2018). (Year: 2018).*

Lim, Bee, et al. "Enhanced deep residual networks for single image super-resolution." Proceedings of the IEEE conference on computer vision and pattern recognition workshops. 2017. doi: https://doi.org/10.48550/arXiv.1707.02921 (Year: 2017).*

Dong, Chao, Chen Change Loy, and Xiaoou Tang. "Accelerating the super-resolution convolutional neural network." Computer Vision ECCV 2016: 14th European Conference, Amsterdam, The Netherlands, Oct. 11-14, 2016, Proceedings, Part II 14. Springer International Publishing, 2016. arXiv:1608.00367 (Year: 2016).*

Sushko, Vadim, et al. "One-Shot GAN: Learning to Generate Samples from Single Images and Videos", https://arxiv.org/abs/2103.13389v1, https://doi.org/10.48550/arXiv.2103.13389 (Year: 2021).*

Karras, Tero, et al. "Progressive growing of gans for improved quality, stability, and variation." arXiv preprint arXiv:1710.10196 (2017). (Year: 2017).*

Y. Qiu, R. Wang, D. Tao and J. Cheng, "Embedded Block Residual Network: A Recursive Restoration Model for Single-Image Super-Resolution," 2019 IEEE/CVF International Conference on Computer Vision (ICCV), Seoul, Korea (South), 2019, pp. 4179-4188, doi: 10.1109/ICCV.2019.00428. (Year: 2019).*

T. Tong, G. Li, X. Liu and Q. Gao, "Image Super-Resolution Using Dense Skip Connections," 2017 IEEE International Conference on Computer Vision (ICCV), Venice, Italy, 2017, pp. 4809-4817, doi: 10.1109/ICCV.2017.514. (Year: 2017).*

Written Opinion of the International Search Authority with English translation cited in counterpart PCT application No. PCT/CN2021/127079, completed Jul. 13, 2022, 13 pages.

T. Shaham, T. Dekel and T. Michaeli, "SinGAN: Learning a Generative Model From a Single Natural Image," in 2019 IEEE/CVF International Conference on Computer Vision (ICCV), Seoul, Korea (South), Sep. 4, 2019, pp. 4569-4579. doi: 10.1109/ICCV.2019.00467.

* cited by examiner

Prior Art

Fig. 4

Prior Art

VIDEO PROCESSING METHOD AND DEVICE, ELECTRONIC APPARATUS, AND READABLE STORAGE MEDIUM

CROSS-REFERENCE TO RELATED APPLICATION

This application is the U.S. national phase of PCT Application No. PCT/CN2021/127079 filed on Oct. 28, 2021, which is incorporated herein by reference in its entirety.

TECHNICAL FIELD

The present disclosure relates to the field of image processing technology, in particular to a video processing method, a video processing device, an electronic apparatus, and a readable storage medium.

BACKGROUND

In an image processing technology, images that meet specific requirements are supported to be generated from certain images through model training, e.g., an image with a higher resolution or a different size is generated in accordance with original images after continuous model training.

SUMMARY

In one aspect, the present disclosure provides in some embodiments a video processing method, including: obtaining input data, the input data including picture data and/or video data; and inputting the input data into a video processing model to obtain output video data. A resolution and/or a duration of the output video data is not equal to a resolution and/or a duration of the input data, the video processing model includes a plurality of generators arranged in sequence and corresponding to different image resolutions, each generator in the plurality of generators includes a transposed three-dimensional (3D) convolution unit and a plurality of first 3D convolutional layers, the transposed 3D convolution unit is configured to generate first output data in accordance with the input data and intermediate processing data of the generator, the output video data is obtained in accordance with the first output data, and the intermediate processing data is obtained through inputting the input data into the plurality of first 3D convolutional layers.

In a possible embodiment of the present disclosure, the generator further includes a second 3D convolutional layer, the second 3D convolutional layer is configured to adjust the first output data to obtain second output data, and a step size of at least one dimension of the second 3D convolutional layer is greater than a step size of the transposed 3D convolution unit.

In a possible embodiment of the present disclosure, the second 3D convolutional layer includes a first step size corresponding to a time dimension and a second step size corresponding to an output size dimension, and the transposed 3D convolution unit includes a third step size corresponding to the time dimension and a fourth step size corresponding to the output size dimension.

In a possible embodiment of the present disclosure, a ratio of the first step size to the third step size is not equal to a ratio of the second step size to the fourth step size.

In a possible embodiment of the present disclosure, the quantity of the first 3D convolutional layers is four.

In a possible embodiment of the present disclosure, each of the first 3D convolutional layers includes a 3D convolution unit and a residual layer arranged in sequence.

In a possible embodiment of the present disclosure, in the case that the input data includes the video data and the duration of the output video data is not equal to the duration of the input data, a plurality of first images corresponds to a same second image. The plurality of first images is a plurality of different images in the input data, and the second image is one image in the output video data.

In a possible embodiment of the present disclosure, the video processing model is obtained through a generative adversarial network after model training, and the generative adversarial network includes the generator and a discriminator. The generator is a model with a low-resolution image as an input and a high-resolution video sequence as an output; the discriminator is a model with an image as an input and a discrimination result for the image as an output; and a loss function for the model training is determined in accordance with an adversarial loss between the generator and the discriminator, and an input and output reconstruction loss of the generator.

In a possible embodiment of the present disclosure, in the case that the input data includes the video data, prior to inputting the input data into the video processing model to obtain the output video data, the video processing method further includes: dividing the input data into a plurality of video sequences at a predetermined time interval; extracting 3D-patches of each video sequence, each of pixels in the video sequence being located in at least one of the 3D-patches, and at least a part of the pixels being located in a plurality of the 3D-patches; and taking the 3D-patches as an input of the video processing model.

In another aspect, the present disclosure provides in some embodiments a video processing device, including: an input data obtaining module configured to obtain input data, the input data including picture data and/or video data; and an input module configured to input the input data into a video processing model to obtain output video data. The video processing model includes a plurality of generators arranged in sequence and corresponding to different image resolutions, each generator in the plurality of generators includes a transposed 3D convolution unit and a plurality of first 3D convolutional layers, the transposed 3D convolution unit is configured to generate first output data in accordance with the input data and intermediate processing data of the generator, the output video data is obtained in accordance with the first output data, and the intermediate processing data is obtained through inputting the input data into the plurality of first 3D convolutional layers.

In a possible embodiment of the present disclosure, the generator further includes a second 3D convolutional layer, the second 3D convolutional layer is configured to adjust the first output data to obtain second output data, and a step size of at least one dimension of the second 3D convolutional layer is greater than a step size of the transposed 3D convolution unit.

In a possible embodiment of the present disclosure, the second 3D convolutional layer includes a first step size corresponding to a time dimension and a second step size corresponding to an output size dimension, and the transposed 3D convolution unit includes a third step size corresponding to the time dimension and a fourth step size corresponding to the output size dimension.

In a possible embodiment of the present disclosure, a ratio of the first step size to the third step size is not equal to a ratio of the second step size to the fourth step size.

In a possible embodiment of the present disclosure, the quantity of the first 3D convolutional layers is four.

In a possible embodiment of the present disclosure, each of the first 3D convolutional layers includes a 3D convolution unit and a residual layer arranged in sequence.

In a possible embodiment of the present disclosure, in the case that the input data includes the video data and the duration of the output video data is not equal to the duration of the input data, a plurality of first images corresponds to a same second image. The plurality of first images is a plurality of different images in the input data, and the second image is one image in the output video data.

In a possible embodiment of the present disclosure, the video processing model is obtained through a generative adversarial network after model training, and the generative adversarial network includes the generator and a discriminator. The generator is a model with a low-resolution image as an input and a high-resolution video sequence as an output; the discriminator is a model with an image as an input and a discrimination result for the image as an output; and a loss function for the model training is determined in accordance with an adversarial loss between the generator and the discriminator, and an input and output reconstruction loss of the generator.

In a possible embodiment of the present disclosure, in the case that the input data includes the video data, the device further includes: a video sequence dividing module configured to divide the input data into a plurality of video sequences at a predetermined time interval; a 3D-patch extraction module configured to extract 3D-patches of the video sequence, each of pixels in the video sequence being located in at least one of the 3D-patches, and at least a part of the pixels being located in a plurality of the 3D-patches; and an input data determination module configured to take the 3D-patches as an input of the video processing model.

In yet another aspect, the present disclosure provides in some embodiments an electronic apparatus, including a memory, a processor, and a program stored in the memory and executed by the processor. The program is executed by the processor so as to implement the steps in the above-mentioned image processing method.

In still yet another aspect, the present disclosure provides in some embodiments a readable storage medium storing therein a program. The program is executed by a processor so as to implement the steps in the above-mentioned image processing method.

BRIEF DESCRIPTION OF THE DRAWINGS

In order to illustrate the technical solutions of the embodiment of the present disclosure in a clearer manner, the drawings desired for the embodiment of the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to illustrate the technical solutions of the embodiment of the present disclosure in a clearer manner, the drawings desired for the embodiment of the present disclosure will be described hereinafter briefly. Obviously, the following drawings merely relate to some embodiments of the present disclosure, and based on these drawings, a person skilled in the art may obtain the other drawings without any creative effort.

Such words as "first" and "second" used in the description and claims are merely used to differentiate different components rather than to represent any order, number or importance. It should be appreciated that, the number may be interchanged under appropriate circumstances so as to describe schemes in the embodiment of the present disclosure, for example, schemes implemented sequentially except those illustrated or described herein. Furthermore, such words as "comprising" "including" and any variations thereof, are intended to cover a non-exclusive inclusion, e.g., a process, a method, a system, a product, or a device that includes a series of steps or elements is not necessarily limited to the explicitly listed steps or elements, but may include other steps or elements not expressly listed or inherent to such a process, a method, a product or apparatus. Furthermore, such words as "and/or" used in the description and claims means at least one of the connected objects, such as A and/or B and/or C, means seven cases including A alone, B alone, C alone, and both A and B, both B and C, both A and C, and both A, B and C. Similarly, such words as "at least one of A and B" used in the description and claims means "A alone, B alone, or both A and B".

The present disclosure provides in some embodiments a video processing method.

Figures 1, 2:
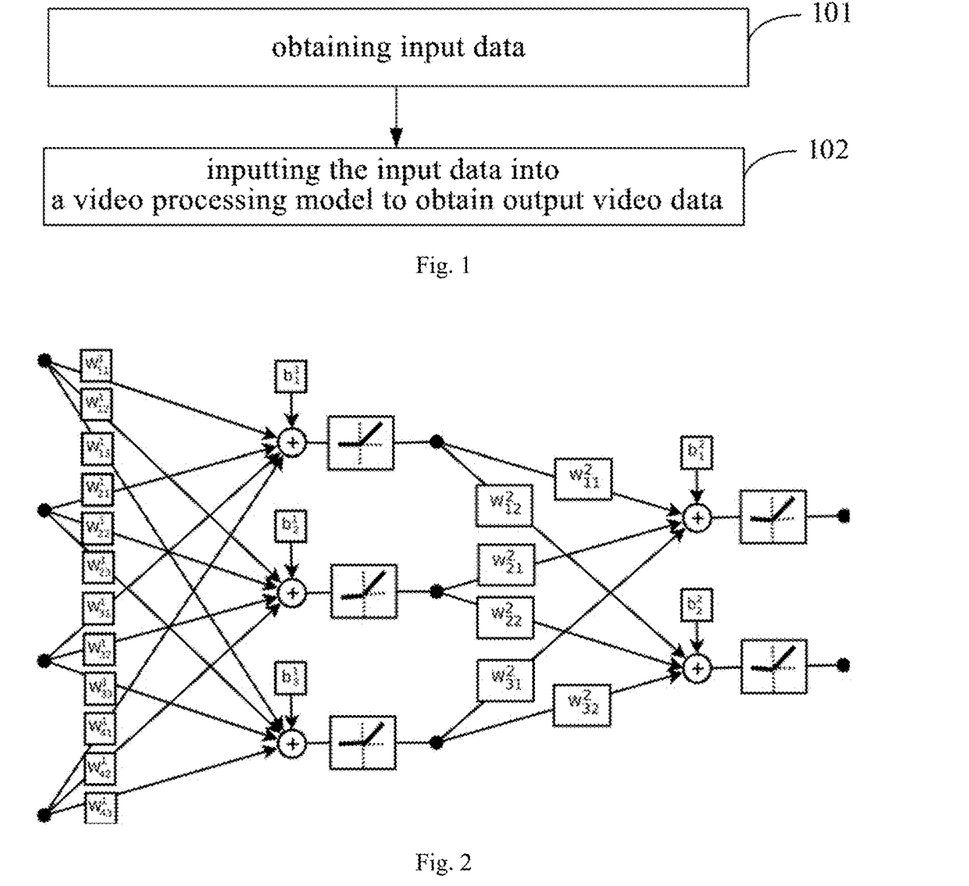
FIG. 1 is a flow chart of a video processing method according to one embodiment of the present disclosure.
FIG. 2 is a schematic view showing a convolutional neural network according to one embodiment of the present disclosure.

As shown in FIG. 1, in some embodiments of the present disclosure, the video processing method includes the following steps.

Step 101: obtaining input data.

In the embodiments of the present disclosure, the input data includes picture data and/or video data.

Step 102: inputting the input data into a video processing model to obtain output video data.

In the embodiments of the present disclosure, the video processing model is obtained through model training, and the video processing model may be a convolutional neural network.

The convolutional neural network is a neural network that uses images as input/output and replaces scalar weights with filters (convolutions).

FIG. 2 shows a three-layer convolutional neural network. The convolutional neural network obtains four input images at a left side, has three units (output images) at a hidden layer in the middle and two units at an output layer, and generates two output images.

Each weighted box corresponds to one filter (e.g., a 3*3*3 kernel or a 5*5*5 kernel), where a superscript of each parameter is a label indicating an input layer index number, a subscript is labels of an input unit and an output unit in turn, and a deviation b is a scalar added to the output of the convolution. A result of adding a plurality of convolutions and bias networks is passed through an activation box, which typically corresponds to a rectified linear unit (ReLU), a sigmoid function, or a hyperbolic tangent. The filters and bias networks are fixed during the operation, and they are obtained through a training process with a set of input/output sample images, and adjusted in accordance with an application to meet some optimization criteria. In general, the three-layer convolutional neural network is called as a shallow convolutional neural network, and a convolutional neural network with more than five layers is usually called as a deep convolutional neural network.

In some embodiments of the present disclosure, the video processing model is obtained through a generative adversarial network (GAN) after model training.

Figure 3:
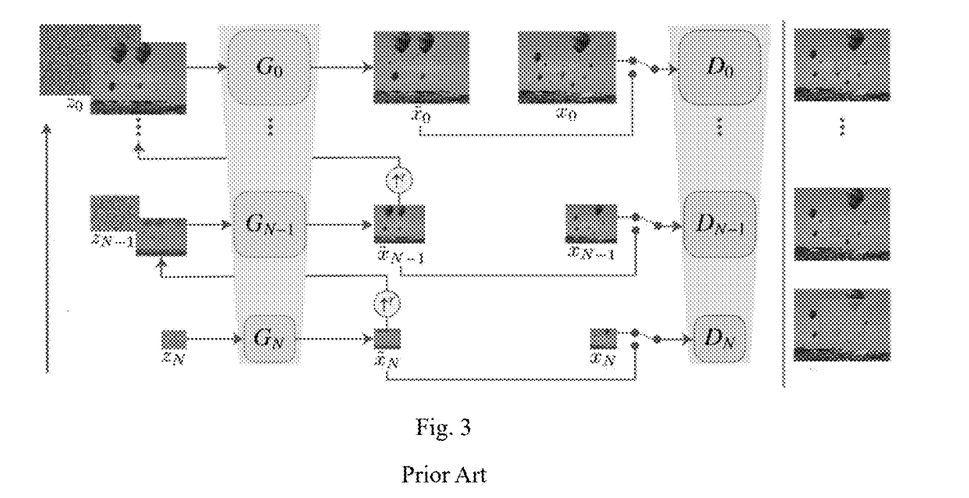
FIG. 3 is a schematic view showing the training of a generative adversarial network according to one embodiment of the present disclosure.

As shown in FIG. 3, in a model training process of the GAN, a generator (G) and a discriminator (D) need to be established. The generator is used to perform a generation task, and the discriminator is used to judge whether a generation result is correct or not.

For example, as shown in FIG. 3, in a possible embodiment of the present disclosure, in the training process of the GAN, the generator is used to obtain the output data based on the input data, an output result of the generator is marked as Fake, and real data meeting a training target is marked as Real. The discriminator is used to discriminate the output result of the generator and the real data. Parameters of the generator are further adjusted in accordance with a discrimination result, the generator and the discriminator are alternately trained in accordance with an established loss function until the loss function converges or the predetermined quantity of iterations have been completed. At this time, the training process of the GAN is completed. The generator after training is used as the model.

In some embodiments of the present disclosure, to be specific, the GAN includes the generator and the discriminator. The generator is a model with a low-resolution image as an input and a high-resolution video sequence as an output, the discriminator is a model with an image as an input and a discrimination result for the image as an output, and a loss function for the model training includes an adversarial loss Lady between the generator and the discriminator, and an input and output reconstruction loss Lrec of the generator.

Figure 4:
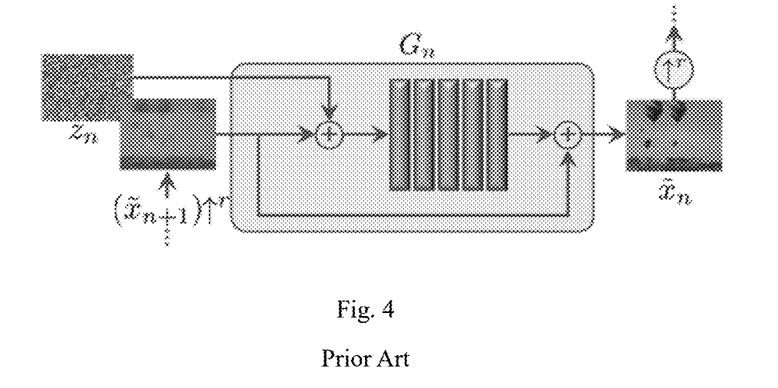
FIG. 4 is a schematic view showing a generator according to one embodiment of the present disclosure.

As shown in FIG. 4, it should be appreciated that, the generator is used to remove a noise based on an image added with a noise map zn, obtain an output result, compare the output result with an real image, and construct the loss function for the model training.

In some embodiments of the present disclosure, the constructed loss function includes:

$$\min_{G_n} \max_{D_n} \mathcal{L}_{adv}(G_n, D_n) + \alpha \mathcal{L}_{rec}(G_n), \quad (1).$$

$$\mathcal{L}_{rec} = \|G_n(0, (\tilde{x}_{n+1}^{rec})\uparrow^r) - x_n\|^2, \text{ and for}$$

$$n = N, \text{ we use } \mathcal{L}_{rec} = \|G_N(z^*) - x_N\|^2, \quad (2).$$

In formula (1), $\alpha$ represents a predetermined coefficient, Gn represents an $n^{th}$ generator, Dn represents an $n^{th}$ discriminator, and a value of n ranges from 0 to N. In formula (2), a first row represents the reconstruction loss Lrec when n is not equal to N, a second row represents the reconstruction loss Lrec when n is equal to N, where $x\bar{\ }n$ represents an output result of the $n^{th}$ generator, xn represents a real result corresponding to $x\bar{\ }n$, and z represents the noise map.

Figure 5:
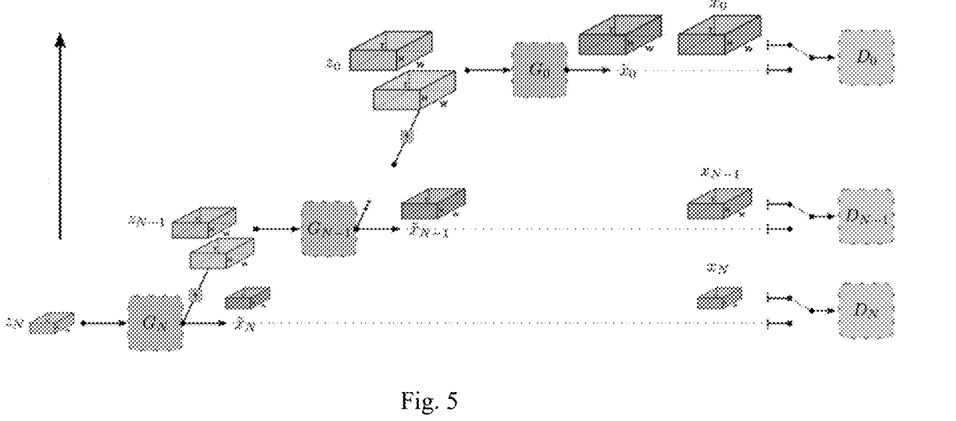
FIG. 5 is another schematic view showing the training of the generative adversarial network according to one embodiment of the present disclosure.

The video processing model includes a plurality of generators arranged in sequence and corresponding to different image resolutions, as shown in FIG. 3 and FIG. 5. In the embodiments of the present disclosure, the generation of an image with the minimum resolution from the low-resolution noise is first learned. When the learning task has been completed, the output is amplified and a higher-resolution noise is added, and a new generator is learned to generate an image with a higher resolution. According to a sequence from bottom to top in FIG. 3 and FIG. 5, the above training process is performed continuously. As indicated in a top row in FIG. 3 and FIG. 5, the model training is completed until the resolution of the output image is the same as the resolution of the real image corresponding to the training target.

Noise inputs corresponding to different resolutions are independent samples with the same distribution, so each pixel value is independent of the other pixel values. At the same time, the generator is fully convolutional, so it is able to generate the images at different resolutions through changing the resolutions of the noise inputs.

Figure 6:
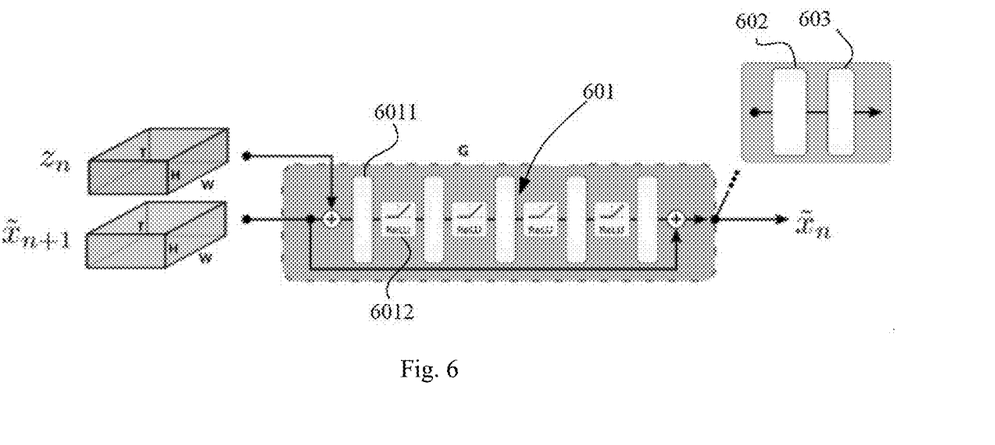
FIG. 6 is another schematic view showing the generator according to one embodiment of the present disclosure.

As shown in FIG. 6, each generator G includes a transposed 3D convolution unit 602 and a plurality of first 3D convolutional layers 601, the transposed 3D convolution unit 602 is configured to generate first output data in accordance with the input data and intermediate processing data of the generator G, the output video data is obtained in accordance with the first output data, and the intermediate processing data is obtained through inputting the input data into the plurality of first 3D convolutional layers 601.

In some embodiments of the present disclosure, the quantity of the first 3D convolutional layers 601 is four. In some embodiments of the present disclosure, each of the first 3D convolutional layers includes a 3D convolution unit 6011 and a residual layer 6012 arranged in sequence.

It should be appreciated that, a conventional pyramid-structured generative adversarial network (SinGAN) is merely suitable for adjusting a two-dimensional (2D) image. In the embodiments of the present disclosure, through the additional transposed 3D convolution unit 602, it is able to maintain a one-to-many mapping through the transposed 3D convolution unit 602, so as to increase the quantity of dimensions of the data to be processed, thereby to process a 3D image, i.e., output the output images as video files.

As shown in FIG. 6 again, in some embodiments of the present disclosure, the generator G further includes a second 3D convolutional layer 603, the second 3D convolutional layer 603 is configured to adjust the first output data to obtain second output data, and a step size of at least one dimension of the second 3D convolutional layer 603 is greater than a step size of the transposed 3D convolution unit 602. In some embodiments of the present disclosure, the step size of each dimension of the second 3D convolutional layer 603 is greater than the step size of the transposed 3D convolution unit 602.

Through controlling the step size of the second 3D convolutional layer 603 to be greater than the step size of the transposed 3D convolution unit 602, it is able to perform an up-sampling operation through the second 3D convolutional layer 603, thereby to enlarge the size of the image or reduce a duration of the image.

Here, the adjustment of the first output data specifically refers to adjusting the duration or the resolution of the first output data, e.g., adjusting a length or a width of first output data, or reducing the duration of a first video. The adjusted first output data is used as the second output data.

It should be appreciated that, amplification factors for time and space (image resolution) need to be implemented based on different adjustments due to introduction of the time dimension. When at least one of the time dimension and a space dimension needs to be adjusted, the second 3D convolutional layer 603 is further added to adjust the time dimension or the space dimension though adjusting the step size of the dimension.

In some embodiments of the present disclosure, the second 3D convolutional layer 603 includes a first step size corresponding to a time dimension and a second step size corresponding to an output size dimension, and the transposed 3D convolution unit 602 includes a third step size corresponding to the time dimension and a fourth step size corresponding to the output size dimension.

In the embodiments of the present disclosure, for example, the first step size of the second 3D convolutional layer 603 corresponding to the time dimension T is A, second step sizes corresponding to output size dimensions H and W are B and C respectively, the third step size of the transposed 3D convolution unit corresponding to the time dimension T is X, fourth step sizes corresponding to output size dimensions H and W are Y and Z respectively. It should be appreciated that, the time dimension T corresponds to the duration of the video data, and the output size dimensions H and W correspond to the width and height of the video data respectively, so as to indicate the resolution information about the video data.

When A=B=C=3 and X=Y=Z=2, the output result of the transposed 3D convolution unit 602 may be amplified by 1.5 times, i.e., by a ratio of 3/2.

A ratio of the first step size to the third step size and a ratio of the second step size to the fourth step size may be equal or not, i.e., a ratio of A to X and a ratio of B to Y may be equal or not, so as to amplify the time dimension and the space dimension at different proportions.

For example, high frequency textures in space may be stationary, i.e., the frequency of the high frequency textures in the time dimension is very low. In this regard, the high frequency textures may be compressed in the time dimension. Due to low frequency in the time dimension, useful information will not be lost even if the time dimension is compressed.

Through adjusting the time dimension of the input data, it is able to improve the adaptability to meet display requirements at different sizes. Through adjusting the space dimension of the input data, it is able to control the duration of the output video data without any loss of information, thereby to enable specific contents to meet requirements on a playing time period under different scenarios. In this way, it is able to improve a processing effect of the video data and meet different requirements. The time dimension and the space dimension are adjusted at different proportions, so it is able to meet the requirements in various scenarios as well as the requirements on the video time period and the video size.

In some embodiments of the present disclosure, in the case that the input data includes the video data, prior to inputting the input data into the video processing model to obtain the output video data, the method further includes: dividing the input data into a plurality of video sequences at a predetermined time interval; extracting 3D-patches of the video sequence, each of pixels in the video sequence being located in at least one of the 3D-patches, and at least a part of the pixels being located in a plurality of the 3D-patches; and taking the 3D-patches as an input of the video processing model.

It should be appreciated that, when 3D files are processed in an existing way, a five-dimension tensor needs to be provided in a processor, especially a central processing unit (CPU) or a graphic processing unit (GPU), and five dimensions correspond to batch processing, channel, time, width and height respectively. Hence, the amount of data for video processing is much higher than a capability of a general device, so a higher delay occurs and a processing speed is slow.

In the embodiments of the present disclosure, the input data is converted into 3D-Patches.

Figure 7:
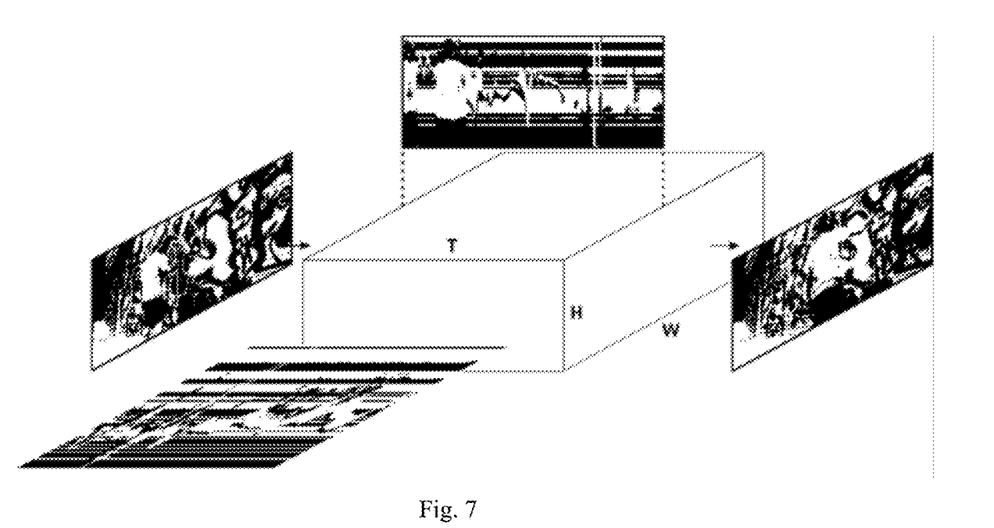
FIG. 7 is a schematic view showing a video sequence according to one embodiment of the present disclosure.

As shown in FIG. 7, in the embodiments of the present disclosure, a video sequence includes a time dimension T corresponding to the duration of the video sequence, and two space dimensions H and W corresponding to the width and height of the video sequence respectively.

Figure 8:
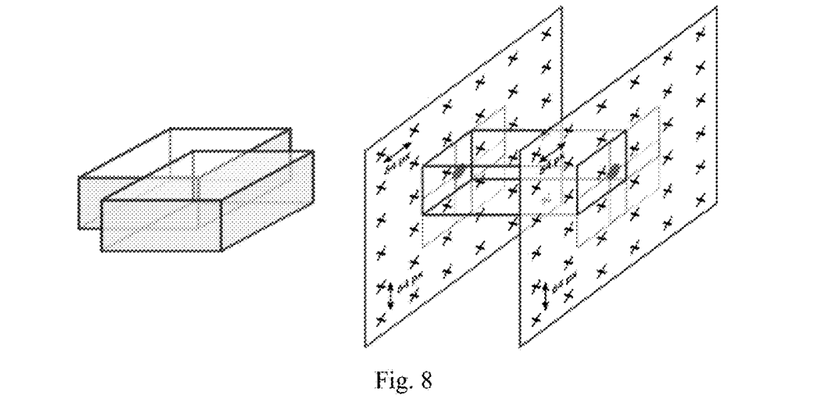
FIG. 8 is a schematic view showing a 3D-patch according to one embodiment of the present disclosure.

As shown in FIG. 8, in the embodiments of the present disclosure, the 3D-patches of the video sequence are extracted. Each of pixels in the video sequence is located in at least one of the 3D-patches, so actually all information in the corresponding video sequence is included through all the 3D-patches. Through adjusting sizes of the 3D-patches, it is able to meet processing requirements on a device processor, reduce the quantity of data dimensions, and fully utilize the capability of the processor.

The 3D-patch processed by the first 3D convolutional layer and the transposed 3D convolution unit may be interpreted as the first output data. The 3D-patches may be combined into continuous video data based on a relative positional relationship among the 3D-patches, and the obtained video data may be interpreted as the output video data.

It should be appreciated that, when the size or duration of the output video data needs to be adjusted, the second 3D convolutional layer is further provided to process the first output data to obtain the second output data, and generate the output video data in accordance with the second output data.

At least a part of the pixels are located in a plurality of 3D-patches, i.e., the 3D-patches overlap each other to some extent, so as to reduce blocking shadows. The time dimension and the output size dimension of the 3D-patches are adjustable, so when the video data is divided into the 3D-patches, it is able to process the video data in any time dimension and output size dimension.

In some embodiments of the present disclosure, in the case that the input data includes the video data and the duration of the output video data is not equal to the duration of the input data, a plurality of first images corresponds to a same second image. The plurality of the first images is a plurality of different images in the input data, and the second image is one image in the output video data.

Figure 9:
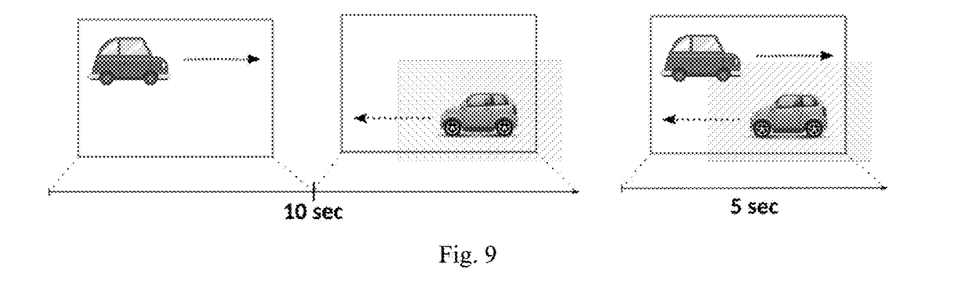
FIG. 9 is a schematic view showing an application scenario according to one embodiment of the present disclosure.

It should be appreciated that, the scheme in the embodiments of the present disclosure may also be used to adjust the image or duration of the video data. As shown in FIG. 9, in a possible embodiment of the present disclosure, the scheme is used to compress a video sequence, for example, a duration of 10 seconds of original video may be compressed to 5 seconds through adjusting a time dimension parameter. For example, two vehicles originally in two different images are adjusted to be displayed in a same image.

That is, contents of a plurality of images in the input data are displayed in one image of the output video data, so as to compress the duration of the video without any loss of the essential contents.

The present disclosure further provides in some embodiments a video processing device.

Figure 10:
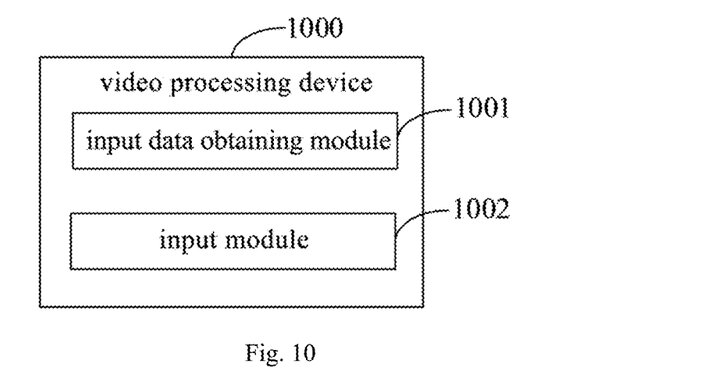
FIG. 10 is a schematic view showing a video processing device according to one embodiment of the present disclosure.

As shown in FIG. 10, in a possible embodiment of the present disclosure, the video processing device 1000 includes: an input data obtaining module 1001 configured to obtain input data, the input data including picture data and/or video data; and an input module 1002 configured to input the input data into a video processing model to obtain output video data. The video processing model includes a plurality of generators arranged in sequence and corresponding to different image resolutions, each generator in the plurality of generators includes a transposed 3D convolution unit and a plurality of first 3D convolutional layers, the transposed 3D convolution unit is configured to generate first output data in accordance with the input data and intermediate processing data of the generator, the output video data is obtained in accordance with the first output data, and the intermediate processing data is obtained through inputting the input data into the plurality of first 3D convolutional layers.

In some embodiments of the present disclosure, the generator further includes a second 3D convolutional layer, the second 3D convolutional layer is configured to adjust the first output data to obtain second output data, and a step size of at least one dimension of the second 3D convolutional layer is greater than a step size of the transposed 3D convolution unit.

In some embodiments of the present disclosure, the second 3D convolutional layer includes a first step size corresponding to a time dimension and a second step size corresponding to an output size dimension, and the transposed 3D convolution unit includes a third step size corresponding to the time dimension and a fourth step size corresponding to the output size dimension.

In some embodiments of the present disclosure, a ratio of the first step size to the third step size is not equal to a ratio of the second step size to the fourth step size.

In some embodiments of the present disclosure, the quantity of the first 3D convolutional layers is four.

In some embodiments of the present disclosure, each of the first 3D convolutional layers includes a 3D convolution unit and a residual layer arranged in sequence.

In some embodiments of the present disclosure, in the case that the input data includes the video data and the duration of the output video data is not equal to the duration of the input data, a plurality of first images corresponds to a same second image. The plurality of the first images is a plurality of different images in the input data, and the second image is one image in the output video data.

In some embodiments of the present disclosure, the video processing model is obtained through a generative adversarial network after performing model training, and the generative adversarial network includes the generator and a discriminator. The generator is a model with a low-resolution image as an input and a high-resolution video sequence as an output, the discriminator is a model with an image as an input and a discrimination result for the image as an output, and a loss function for the model training is determined in accordance with an adversarial loss between the generator and the discriminator, and an input and output reconstruction loss of the generator.

In some embodiments of the present disclosure, in the case that the input data includes the video data, the device further includes: a video sequence dividing module configured to divide the input data into a plurality of video sequences at a predetermined time interval; a 3D-patch extraction module configured to extract 3D-patches of the video sequence, each of pixels in the video sequence being located in at least one of the 3D-patches, and at least a part of the pixels being located in a plurality of the 3D-patches; and an input data determination module configured to take the 3D-patches as an input of the video processing model.

The video processing device 1000 may be used to implement the steps in the above-mentioned video processing method with a same technical effect, which will not be particularly defined herein.

Figure 11:
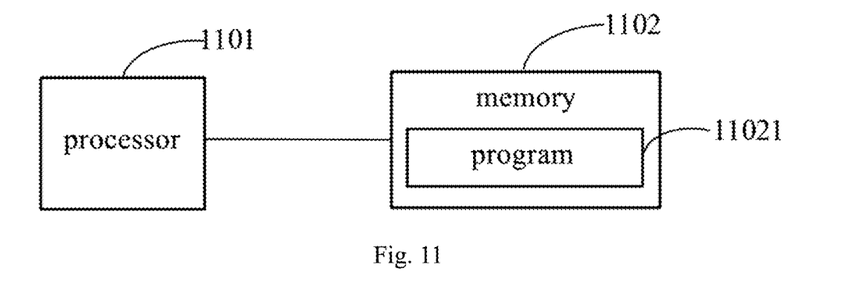
FIG. 11 is a schematic view showing an electronic apparatus according to one embodiment of the present disclosure.

The present disclosure further provides in some embodiments an electronic apparatus. As shown in FIG. 11, the electronic apparatus includes a processor 1101, a memory 1102, and a program 11021 stored in the memory 1102 and executed by the processor 1101.

In the case that the electronic apparatus is a user equipment, the program 11021 is executed by the processor 1101 so as to implement the steps in the video processing method in FIG. 1 with a same technical effect, which will not be particularly defined herein.

In the case that the electronic apparatus is a network side device, the program 11021 is executed by the processor 1101 so as to implement the steps in the video processing method in FIG. 11 with a same technical effect, which will not be particularly defined herein.

It should be appreciated that, all or a part of the steps in the video processing method may be implemented through hardware related to program instructions, and the program may be stored in a readable medium.

The present disclosure further provides in some embodiments a readable storage medium storing therein a computer program. The computer program is executed by a processor so as to implement the steps in the method in FIG. 1 with a same technical effect, which will not be particularly defined herein.

The readable storage medium includes a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A video processing method, comprising:
  obtaining input data, the input data comprising picture data and/or video data; and
  inputting the input data into a video processing model to obtain output video data;
  wherein a resolution and/or a duration of the output video data is not equal to a resolution and/or a duration of the input data, the video processing model comprises a generative adversarial network, the generative adversarial network comprises a generator and a discriminator, the generator comprises a plurality of generator levels arranged in sequence and corresponding to different image resolutions, each generator level in the plurality of generator levels comprises a transposed three-dimensional (3D) convolution unit and a plurality of first 3D convolutional layers, the transposed 3D convolution unit of a current generator level of the plurality of generator levels is configured to generate first output data in accordance with the input data and intermediate processing data of the current generator level, the output video data is obtained in accordance with the first output data, and the intermediate processing data is obtained through inputting the input data into the plurality of first 3D convolutional layers of the current generator level;

wherein each generator level in the plurality of generator levels further comprises a second 3D convolutional layer, the second 3D convolutional layer is configured to adjust the first output data to obtain second output data, and a step size of at least one dimension of the second 3D convolutional layer is greater than a step size of the transposed 3D convolution unit; and wherein the second 3D convolutional layer comprises a first step size corresponding to a time dimension and a second step size corresponding to an output size dimension, and the transposed 3D convolution unit comprises a third step size corresponding to the time dimension and a fourth step size corresponding to the output size dimension.

2. The video processing method according to claim 1, wherein a ratio of the first step size to the third step size is not equal to a ratio of the second step size to the fourth step size.

3. The video processing method according to claim 1, wherein the quantity of the first 3D convolutional layers is four.

4. The video processing method according to claim 3, wherein each of the first 3D convolutional layers comprises a 3D convolution unit and a residual layer arranged in sequence.

5. The video processing method according to claim 1, wherein in the case that the input data comprises the video data and the duration of the output video data is not equal to the duration of the input data, a plurality of first images corresponds to a second image, wherein the plurality of the first images is a plurality of different images in the input data, and the second image is one image in the output video data comprising features of the plurality of the first images.

6. The video processing method according to claim 1, wherein the video processing model is obtained through the generative adversarial network after performing model training;

wherein the generator is a model with a low-resolution image as an input and a high-resolution video sequence as an output;

the discriminator is a model with an image as an input and a discrimination result for the image as an output; and a loss function for the model training is determined in accordance with an adversarial loss between the generator and the discriminator, and an input and output reconstruction loss of the generator.

7. The video processing method according to claim 1, wherein in the case that the input data comprises the video data, prior to inputting the input data into the video processing model to obtain the output video data, the video processing method further comprises:

dividing the input data into a plurality of video sequences at a predetermined time interval;

extracting 3D-patches of the video sequence, each of pixels in the video sequence being located in at least one of the 3D-patches, and at least a part of the pixels being located in a plurality of the 3D-patches; and taking the 3D-patches as an input of the video processing model.

8. A non-transient readable storage medium, configured to store a program, wherein the program is executed by a processor so as to implement the steps in the image processing method according to claim 1.

9. An electronic apparatus, comprising a memory, a processor, and a program stored in the memory and executed by the processor, wherein the program is executed by the processor so as to:

obtain input data, the input data comprising picture data and/or video data; and input the input data into a video processing model to obtain output video data;

wherein a resolution and/or a duration of the output video data is not equal to a resolution and/or a duration of the input data, the video processing model comprises a generative adversarial network, the generative adversarial network comprises a generator and a discriminator, the generator comprises a plurality of generator levels arranged in sequence and corresponding to different image resolutions, each generator level in the plurality of generator levels comprises a transposed 3D convolution unit and a plurality of first 3D convolutional layers, the transposed 3D convolution unit of a current generator level of the plurality of generator levels is configured to generate first output data in accordance with the input data and intermediate processing data of the current generator level, the output video data is obtained in accordance with the first output data, and the intermediate processing data is obtained through inputting the input data into the plurality of first 3D convolutional layers of the current generator level;

wherein each generator level in the plurality of generator levels further comprises a second 3D convolutional layer, the second 3D convolutional layer is configured to adjust the first output data to obtain second output data, and a step size of at least one dimension of the second 3D convolutional layer is greater than a step size of the transposed 3D convolution unit;

wherein the second 3D convolutional layer comprises a first step size corresponding to a time dimension and a second step size corresponding to an output size dimension, and the transposed 3D convolution unit comprises a third step size corresponding to the time dimension and a fourth step size corresponding to the output size dimension.

10. The electronic apparatus according to claim 9, wherein a ratio of the first step size to the third step size is not equal to a ratio of the second step size to the fourth step size.

11. The electronic apparatus according to claim 9, wherein the quantity of the first 3D convolutional layers is four.

12. The electronic apparatus according to claim 11, wherein each of the first 3D convolutional layers comprises a 3D convolution unit and a residual layer arranged in sequence.

13. The electronic apparatus according to claim 9, wherein in the case that the input data comprises the video data and the duration of the output video data is not equal to the duration of the input data, a plurality of first images corresponds to a second image, wherein the plurality of the first images is a plurality of different images in the input data, and the second image is one image in the output video data comprising features of the plurality of the first images.

14. The electronic apparatus according to claim 9, wherein the video processing model is obtained through the generative adversarial network after performing model training;

wherein the generator is a model with a low-resolution image as an input and a high-resolution video sequence as an output;

the discriminator is a model with an image as an input and a discrimination result for the image as an output; and a loss function for the model training is determined in accordance with an adversarial loss between the generator and the discriminator, and an input and output reconstruction loss of the generator.

15. The electronic apparatus according to claim 9, wherein in the case that the input data comprises the video data, prior to inputting the input data into the video processing model to obtain the output video data, the processor is further configured to:

divide the input data into a plurality of video sequences at a predetermined time interval;

extract 3D-patches of the video sequence, each of pixels in the video sequence being located in at least one of the 3D-patches, and at least a part of the pixels being located in a plurality of the 3D-patches; and take the 3D-patches as an input of the video processing model.

* * * * *